M. A. CORBETT.
GAS METER CONNECTION.
APPLICATION FILED MAY 12, 1910.
1,036,076.
Patented Aug. 20, 1912.
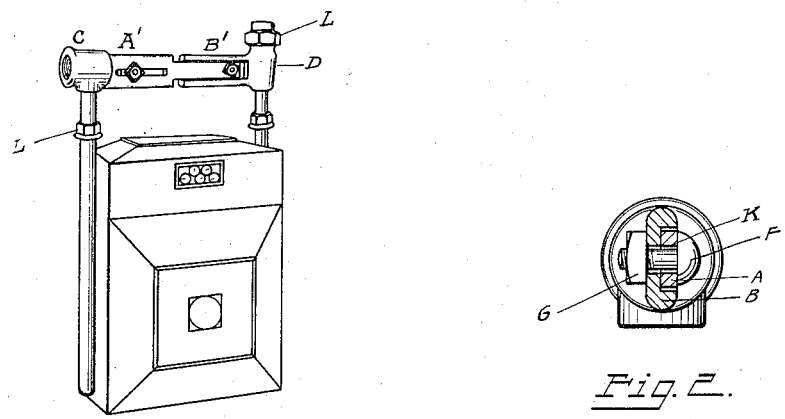
Fig. 1.
Fig. 2.
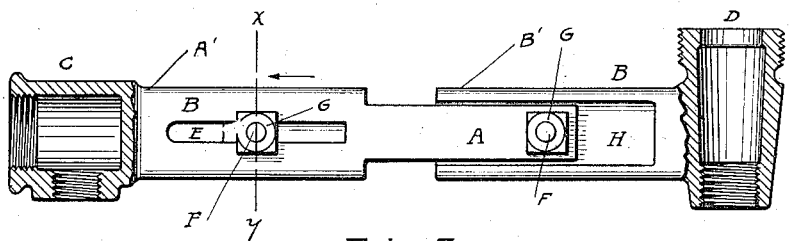
Fig. 3.
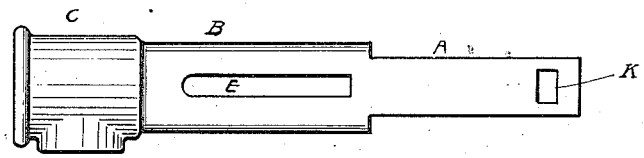
Fig. 4.
Witnesses
E. B. Maurer
Victor L. Dodge
Inventor
Michael A. Corbett
By C. C. Shepherd
Attorney ary text.

UNITED STATES PATENT OFFICE.

MICHAEL A. CORBETT, OF COLUMBUS, OHIO.

GAS-METER CONNECTION.

1,036,076.  Specification of Letters Patent.  Patented Aug. 20, 1912.

Application filed May 12, 1910. Serial No. 560,814.

*To all whom it may concern:*

Be it known that I, MICHAEL A. CORBETT, a citizen of the United States, residing at Columbus, in the county of Franklin and State of Ohio, have invented certain new and useful Improvements in Gas-Meter Connections, of which the following is a specification.

My invention relates to improvements in gas meter connecting devices and the main object of my improvement is to produce a device of this character that can be readily connected to any meter.

In the accompanying drawings, Figure 1 is a perspective view of a gas meter with my improvement attached, Fig. 2 is a detail of the clamping device through the line *x—y* of Fig. 3, Fig. 3 is a plan view, partly in section of the assembled device, Fig. 4 is a plan view of one of the coöperative elements.

Similar reference characters refer to similar parts in all the drawings.

The invention comprises substantially two separate, independently coöperative parts A' and B', formed with reducing sockets at their outer extremities when assembled, and having two identical interengaging lapping tongues and is adapted for use on any gas meter of the usual construction for the purpose of establishing connection through the meter between the street main and the house.

The reducing socket C is essentially a cap with standard female threaded connection at end and side. The socket D comprises a thimble disposed at right angles to and formed with the shank B, with male and female threaded connections.

Each of the twin members A' and B' consists of a shank B formed at one extremity into a rectangular tongue A of reduced width. The shank is slotted at E to receive a bolt F secured by a nut G and clamps the tongue of the twin member which it is adapted slidably to receive. An oblong rectangular slot K, disposed at right angles to the longitudinal axis of the tongue receives the bolt F to coöperate with the oppositely disposed slot E in the twin member.

In practice my invention is operated as follows: The twin members A' and B' properly connected by bolts passing through their respective slots as described, are applied to the meter and secured thereto by suitable unions L. The cap C is fitted to the main and the thimble D to the house connections by suitable unions L. The meter inlet and outlet pipes being rarely in a true vertical position, difficulty has been experienced in producing a meter connection sufficiently firm and sufficiently adjustable to meet the requirements of various meters. In my invention, the distance between the inlet and outlet pipes is spanned by extending the interlocking twin members B along the slots E and any variation in parallelism in the pipes is taken up by the slot K, sufficient looseness of engagement between the tongue A and the slot K having been permitted in their construction.

Having thus fully described my invention, what I claim as new and desire to secure by Letters Patent is—

1. A connecting device for gas meters comprising two members adapted respectively to be connected to the inlet and outlet pipes of the meter, one of said members having a channel extending longitudinally thereof, the other of said members having a tongue adapted to lie within said channel, connections between said members constructed to permit relatively longitudinal and relatively vertical adjustment thereof.

2. A connecting device for meters comprising a shank formed with a threaded cap and having a channeled recess, and a slot extending longitudinally of the recess, a rectangular tongue formed with the shank and having a transverse slot in the extremity thereof, a twin member interlocking with said tongue, a threaded reducing thimble formed at right angles to the last mentioned member, and unions for connecting the cap and thimble to the gas pipes.

3. A connecting device for meters comprising twin members in combination, a threaded thimble connection on one of said members, and a cap connection on the other of said members, said thimble and cap connections having suitable openings therein, means for holding the members in adjusted position at the outlet and inlet pipes of a gas meter, and connecting means for said members constructed to permit relatively vertical and relatively longitudinal adjustment.

4. A connecting device for meters comprising a shank having a channel therein, and a longitudinal slot therethrough midway of the channel, a tongue of equal length with the shank and of reduced width, said tongue having a slot near the end thereof at right angles to the longitudinal axis, a twin member interlocking with said tongue, means for assembling the twin members in interlocking position, and threaded pipe connections integral with the free ends of the respective shanks adapted to transmit gas through the meter to a house.

5. A connecting device for meters comprising twin members adapted respectively to be connected to the inlet and outlet pipes of a meter, said members being connected by a connection adjustable to place said members either in alinement or in relatively tilted positions and out of alinement.

In testimony whereof I have affixed my signature in presence of two witnesses.

MICHAEL A. CORBETT.

Witnesses:
 E. B. MAURER,
 A. L. PHELPS.